US005170868A

United States Patent [19]
Yamashita et al.

[11] Patent Number: 5,170,868
[45] Date of Patent: Dec. 15, 1992

[54] AUTOMATIC STARTING CLUTCH CONTROL METHOD

[75] Inventors: Yoshinori Yamashita, Shizuoka; Hiroaki Yamamoto, Hyogo, both of Japan

[73] Assignees: Suzuki Motor Corporation; Mitsubishi Denki Kabushiki Kaisha, Tokyo, Japan

[21] Appl. No.: 775,810

[22] Filed: Oct. 11, 1991

[30] Foreign Application Priority Data

Oct. 31, 1990 [JP] Japan .................. 2-294478
Oct. 31, 1990 [JP] Japan .................. 2-294479

[51] Int. Cl.$^5$ ............................................. F16D 43/22
[52] U.S. Cl. ..................... 192/0.032; 192/0.033; 192/0.076; 192/0.09; 192/82 T
[58] Field of Search ............... 192/0.032, 0.033, 0.075, 192/0.076, 0.096, 0.09, 82 T

[56] References Cited

U.S. PATENT DOCUMENTS

| | | | |
|---|---|---|---|
| 4,416,360 | 11/1983 | Fiala | 192/0.076 |
| 4,502,579 | 3/1985 | Makita | 192/0.052 |
| 4,678,069 | 7/1987 | Yoshimura et al. | 192/0.033 |
| 4,732,246 | 3/1988 | Tateno et al. | 192/0.076 X |
| 4,762,213 | 8/1988 | Watanabe | 192/82 T |
| 4,854,433 | 8/1989 | Tellert | 192/0.033 |
| 4,856,380 | 8/1989 | Murano et al. | 74/866 |
| 4,940,122 | 7/1990 | Fujieda | 192/0.032 X |
| 4,962,678 | 10/1990 | Murano et al. | 74/844 |
| 5,022,287 | 6/1991 | Murano et al. | 74/866 |
| 5,042,323 | 8/1991 | Murano et al. | 74/844 |
| 5,050,717 | 9/1991 | Shibayama | 192/0.052 |
| 5,060,770 | 10/1991 | Hirano et al. | 192/0.032 |

FOREIGN PATENT DOCUMENTS

| | | | |
|---|---|---|---|
| 0140924 | 8/1982 | Japan | 192/82 T |
| 57-186656 | 11/1982 | Japan . | |
| 59-43249 | 3/1984 | Japan . | |
| 59-77159 | 5/1984 | Japan . | |
| 0208230 | 11/1984 | Japan | 192/0.076 |
| 61-233256 | 10/1986 | Japan . | |
| 0195026 | 9/1990 | Japan | 192/0.032 |
| 3-125031 | 5/1991 | Japan . | |
| 2093618 | 9/1982 | United Kingdom | 192/82 T |
| 2223076 | 3/1990 | United Kingdom | 192/0.032 |

Primary Examiner—Richard Lorence
Assistant Examiner—Andrea Pitts
Attorney, Agent, or Firm—Flynn, Thiel, Boutell & Tanis

[57] ABSTRACT

A method of controlling a friction type clutch of a vehicle having an engine and a drive train, which clutch is operated by hydraulic oil and is frictionally engageable to transfer rotational driving force from an output shaft of the engine to the drive train, includes the steps of causing the clutch to assume a slipping state of engagement upon starting of the vehicle, and defining a first amount of time as a function of the temperature of the hydrauilc oil. When the first amount of time has elapsed since the starting of the vehicle, the clutch is positively urged from slipping state of engagement into a locked up state of engagement. If the output rotational speed of the clutch reaches a predetermined value, and if a second amount of time which is less than the first amount of time has elapsed since the starting of the vehicle, then the clutch is positively urged from the slipping state of engagement into the locked up state of engagement, even though the first amount of time has not yet elapsed since the starting of the vehicle.

5 Claims, 6 Drawing Sheets

FIG.6
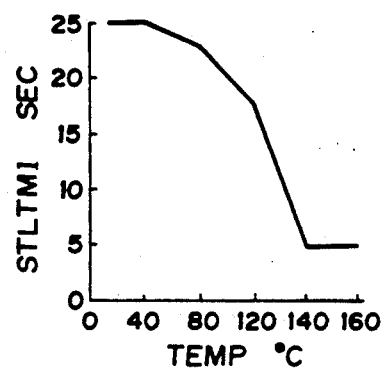
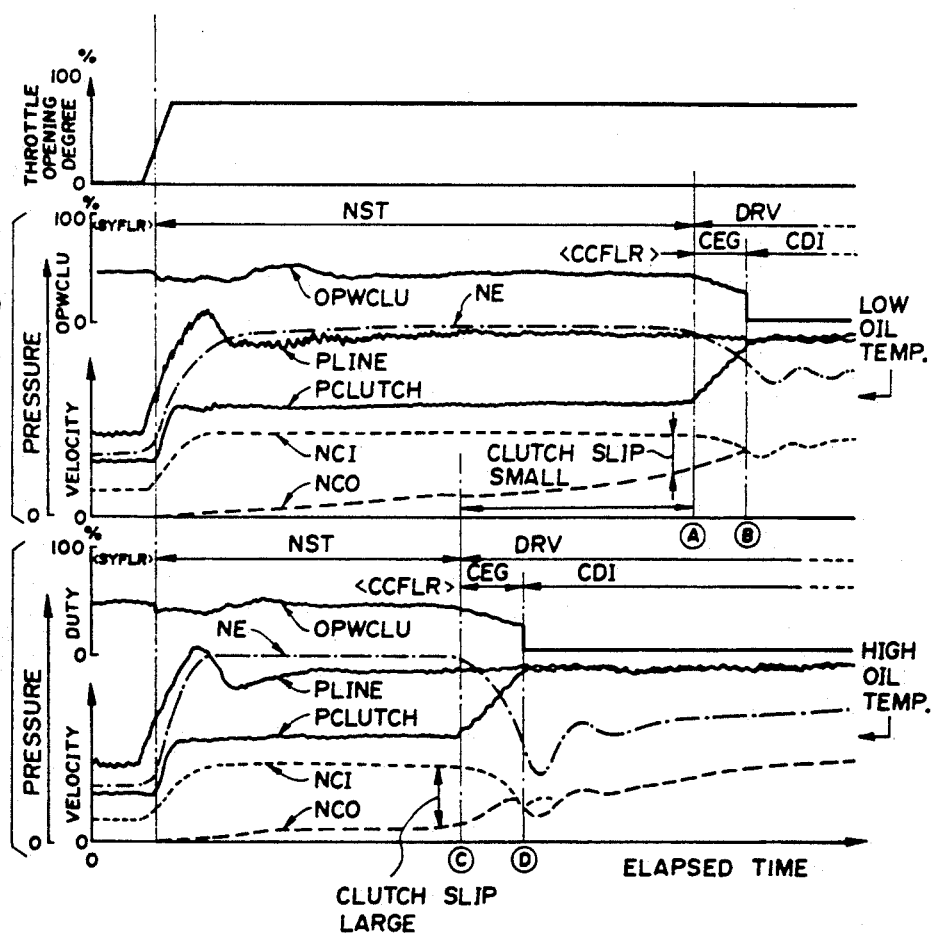
FIG.8 (a)
FIG.8 (b)

AUTOMATIC STARTING CLUTCH CONTROL METHOD

FIELD OF THE INVENTION

The invention relates to an automatic starting clutch control method and, more particularly, to an automatic starting clutch control method in which upon starting of a vehicle, by rapidly setting an automatic starting clutch into a complete coupling state in consideration of a state of the vehicle, an increase in oil temperature of the automatic starting clutch and a burning thereof can be more effectively prevented.

BACKGROUND OF THE INVENTION

In a vehicle such as an automobile or the like, a transmission is provided in order to convert a driving force of an internal combustion engine into a desired drive wheel force in accordance with a running state. As such a transmission, there are known a gear type transmission in which by selectively switching an engaging state of a plurality of stages of gear trains, a gear ratio is changed step by step and a driving force is extracted, a continuous variable transmission in which by increasing or decreasing rotational radii of the driving side and the driven side of a belt wound between a driving side pulley and a driven side pulley, a belt ratio is continuously changed and a driving force is extracted, and the like.

Among vehicles such as automobiles and the like, there is a vehicle having a clutch for connecting and disconnecting a driving force. As a clutch, there has been known an automatic starting clutch which is automatically coupled or removed by feeding/discharging oil pressure by a control section. As means for controlling such an automatic starting clutch, there is known a means for forcedly setting the automatic starting clutch into the complete coupling state in the case where, upon starting of a vehicle, the semi-coupling state of the automatic starting clutch, that is, a stalling (or slipping) state has continued for a predetermined time or longer.

Namely, when the semi-coupling state of the automatic starting clutch continues, there is a disadvantage such that a part of the driving energy of the internal combustion engine changes to heat energy by the sliding of the clutch, thereby causing an increase in oil temperature or burning. Therefore, in the case where the semi-coupling state of the automatic starting clutch has continued for a predetermined time or longer, the automatic starting clutch is forcedly set into the complete coupling state, thereby preventing the increase in oil temperature and the burning.

The applicant of the present invention has already developed an apparatus for controlling the automatic starting clutch (Japanese Patent Application No. 1-260653). According to this control apparatus, in the case where, upon starting of the vehicle, a stalling state of the automatic starting clutch has continued for a predetermined time or longer in a throttle state of a high opening degree, a target engine rotational speed is reduced, thereby preventing burning which would otherwise occur due to a burden of a high load on the automatic starting clutch for a long time.

As a countermeasure for preventing increases in oil temperature and burning in the case where the stalling state of the automatic starting clutch has continued upon starting of a vehicle, as mentioned above, there is a method whereby the automatic starting clutch is forcedly set into the complete coupling state in the case where the semi-coupling state of the automatic starting clutch has continued for a predetermined time or longer upon starting of the vehicle.

Explaining further in more detail, upon starting of a vehicle, the vehicle is controlled into a starting mode by a control section so as to set the automatic starting clutch into a semi-coupling state and, when a stalling time which is measured by a stall limiting timer is equal to or larger than a trigger value for the stall limiting timer, the vehicle is controlled to the driving mode by the control section so as to set the automatic starting clutch into the complete coupling state.

However, such a conventional control method pays no consideration to the state of the vehicle. Therefore, there is a disadvantage in that increases in oil temperature and burning of the automatic starting clutch due to the continuation of the semi-coupling state of the automatic starting clutch cannot be more effectively prevented.

That is, there are many cases in which, upon starting of the vehicle, even if the vehicle state is slightly jerky and a shock occurs, by promptly setting the automatic starting clutch into the complete coupling state, the vehicle can run without any problem after that. In other words, in the conventional control method, there is a disadvantage because the vehicle state is not considered, and the control of the clutch in the starting mode is vainly continued and some increases in oil temperature and burning are caused only because of the amount of time during which such clutch control continues.

On the other hand, in the case where the automatic starting clutch is in the complete coupling state as compared with the case where the automatic starting clutch is in the semi-coupling state in which the clutch slips, driving energy which is generated by the internal combustion engine can be more efficiently transferred to driving wheels, so that a motive power performance can be raised. Consequently, for instance, even if the vehicle state is slightly jerky and a shock occurs upon starting on a climbing slope road, by rapidly setting the automatic starting clutch into the complete coupling state, no problem occurs in the subsequent run.

In the conventional control method, however, since such a vehicle state is not considered, there is a disadvantage such that by setting the automatic starting clutch into the semi-coupling state even upon starting on a climbing slope road, the control of the clutch in the starting mode is continued longer than it is needed in a manner similar to the above, so that some unnecessary increases in oil temperature and burning are caused only because of the amount of time during which such clutch control continues.

It is an object of the invention to provide an automatic starting clutch control method whereby upon starting of a vehicle, by promptly setting the automatic starting clutch into the complete coupling state in consideration of the state of the vehicle, it is possible to prevent a semi-coupling state of the automatic starting clutch that vainly continued, so that increases in oil temperature of the automatic starting clutch and burning thereof can be more effectively prevented.

In an attempt to accomplish the above object, according to the invention, there is provided an automatic starting clutch control method whereby upon starting of a vehicle, the vehicle is controlled to a starting mode by a control section so as to set an automatic starting clutch into a semi-coupling state and, when a stalling time which is measured by a stall limiting timer is equal to or larger than a trigger value for the stall limiting timer, the vehicle is controlled to a driving mode by the control section so as to set the automatic starting clutch into a complete coupling state, characterized in that in the case where the stalling time which is measured by the stall limiting timer is equal to or larger than a trigger value for a starting mode elapsed time of the starting mode and a clutch output rotational speed of the automatic starting clutch is equal to or larger than a trigger value for the clutch output rotational speed, even before the stalling time which is measured by the stall limiting timer reaches the trigger value for the stall limiting timer, the vehicle is controlled to the driving mode by the control section so as to set the automatic starting clutch into the complete coupling state.

According to the construction of the invention, in the case where the stalling time which is measured by the stall limiting timer is equal to or larger than the trigger value for the starting mode elapsed time of the starting mode and the clutch output rotational speed of the automatic starting clutch is equal to or larger than the trigger value for the clutch output rotational speed, even before the stalling time which is measured by the stall limiting timer reaches the trigger value for the stall limiting timer, the vehicle is controlled to the driving mode by the control section so as to set the automatic starting clutch into the complete coupling state, so that the control of the starting mode is not vainly continued and the automatic starting clutch can be promptly set into the complete coupling state in consideration of the vehicle state upon starting of the vehicle.

As a method of controlling an automatic starting clutch which uses a continuous variable transmission, for instance, there have been disclosed control methods in JP-A-57-186656, JP-A-59-43249, JP-A-59-77159, and JP-A-61-233256.

The applicant of the present invention has already filed the aforementioned Japanese Patent Application No. 1-260653, in which a stall limiting timer STLTM is provided to prevent that the starting Control is continued without any limitation and, when a value of the stall limiting timer STLTM is equal to or larger than a trigger value STLTMI of the stall limiting timer, a duty (DUTY, OPWCLU) of a clutch solenoid is gradually reduced to 0%. The trigger value STLTMI of the stall limiting timer is always set to a predetermined value irrespective of the state of the transmission, the duty OPWCLU of the clutch solenoid is gradually decreased to prevent the occurrence of a large shock or an engine stop, and a sudden coupling of the clutch is prevented.

In the conventional automatic starting clutch control method, since the trigger value STLTMI of the stall limiting timer has been set to a unique value, when oil pressure is high, the amount of oil which leaks from each oil passage increases, an amount of oil which is used to clean the clutch also decreases due to leakage, and the clutch is not sufficiently cleaned.

In the case of a deteriorated clutch, friction between a clutch plate and a clutch disk becomes weak and there is a tendency such that the starting control is continued for a longer time as compared with that in the case of the normal clutch. Upon starting by the deteriorated clutch, the oil temperature rises earlier than that in the case of the normal clutch.

Therefore, there is an inconvenience in that increases in oil temperature and burning of the clutch cannot be prevented from a viewpoint of the above two items.

There is also an inconvenience in that, by forcedly coupling the clutch upon starting on a climbing slope road or the like, a shock occurs upon coupling of the clutch and it becomes uncomfortable to ride in the vehicle.

That is, in the case where the starting operation has been performed in a state in which the wheels had sufficiently been braked or in the case where the vehicle has been started on a climbing slope road, the starting control continues for a long time, and a part of the energy applied to the clutch is converted into the heat due to the sliding of the clutch, so that the oil temperature rises and the clutch is burnt.

As a countermeasure for the above problems, a time limit is provided for the starting control and the control to forcedly couple the clutch is executed. However, such a control is performed on the basis of only a result of discrimination concerning whether a predetermined time has elapsed or not irrespective of the state of the transmission. There is a fear that a shock or engine stop may occur upon forced coupling of the clutch. It is desirable to reduce the occurrence of the shock or the engine stop in a state excluding the stalling state.

To eliminate the above disadvantages, it is another object of the invention to provide an automatic starting clutch control method in which an oil temperature sensor to detect oil temperature in an oil pan is provided and, when the oil temperature is high as indicated by a detection signal from the oil temperature sensor, a trigger value is reduced, and when a starting control time as measured by a stall limiting timer is equal to or larger than the trigger value, starting control is stopped by a control unit and the automatic starting clutch is coupled, so that the trigger value can be changed in accordance with the oil temperature, an increase in oil temperature in the starting control can be prevented, and a burning of the clutch can be reduced.

In an attempt to accomplish the above object, according to the invention, there is provided an automatic starting clutch control method in which a stall limiting timer to measure a starting control time is provided and, when the starting control time is equal to or larger than a predetermined trigger value on the basis of a measurement signal from the stall limiting timer, starting control is stopped by the control unit and the automatic starting clutch is coupled, characterized in that an oil temperature sensor to detect the temperature of oil in the oil pan is provided, and when the oil temperature rises as indicated by a detection signal from the oil temperature sensor, the trigger value is reduced, and when the starting control time is equal to or larger than the trigger value on the basis of the measurement signal from the stall limiting timer, the starting control is stopped by the control unit and the automatic starting clutch is coupled.

According to the invention as mentioned above, when the oil temperature is high, the trigger value is reduced, and when the starting control time is equal to or larger than the reduced trigger value, the starting starting clutch is coupled. The trigger value is changed in accordance with the oil temperature, increases in oil temperature in the starting control are prevented, and burning of the clutch is reduced.

BRIEF DESCRIPTION OF THE DRAWINGS

An embodiment of the invention will be described in detail on the basis of the drawings, in which:

FIG. 6 illustrates the relationship between oil temperature and a trigger value of a timer according to the invention;

FIGS. 8(a) and 8(b) respectively illustrate the operation of the invention at low and high oil temperature.

DETAILED DESCRIPTION

Figure 3:
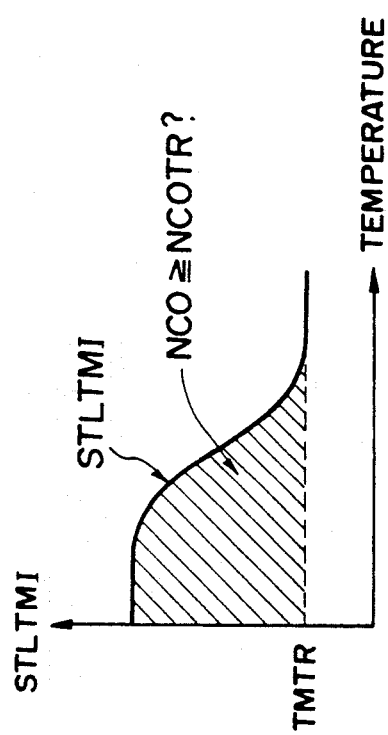
FIG. 3 is a diagram showing a region where, if a clutch output rotational speed is equal to or larger than a trigger for the clutch output rotational speed, start control is discontinued.
Figure 4:
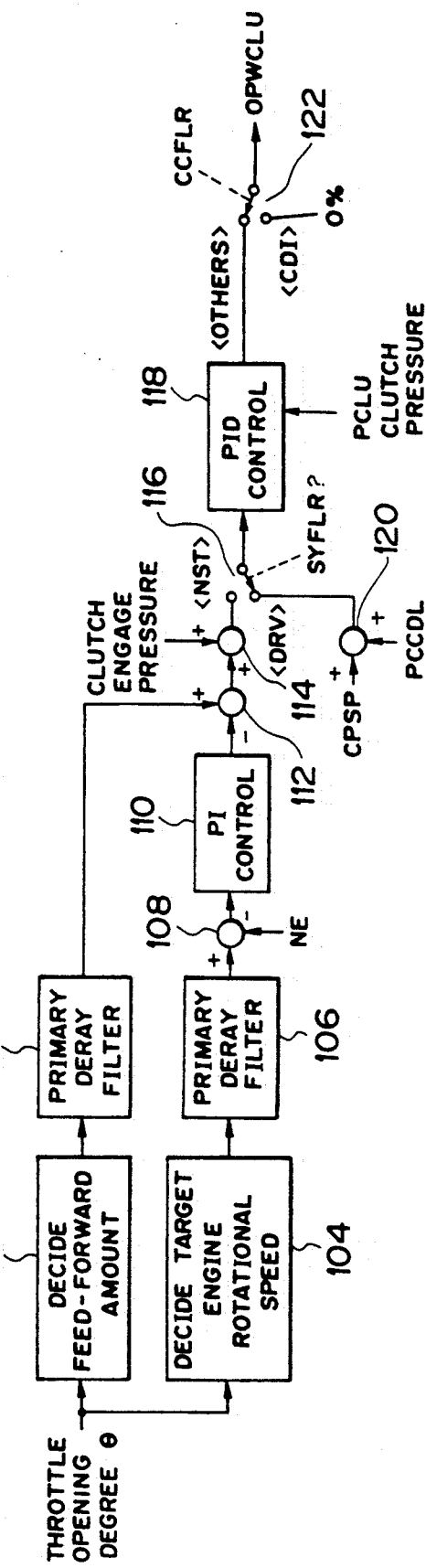
FIG. 4 is a block diagram which illustrates the control according to the invention.
Figure 5:
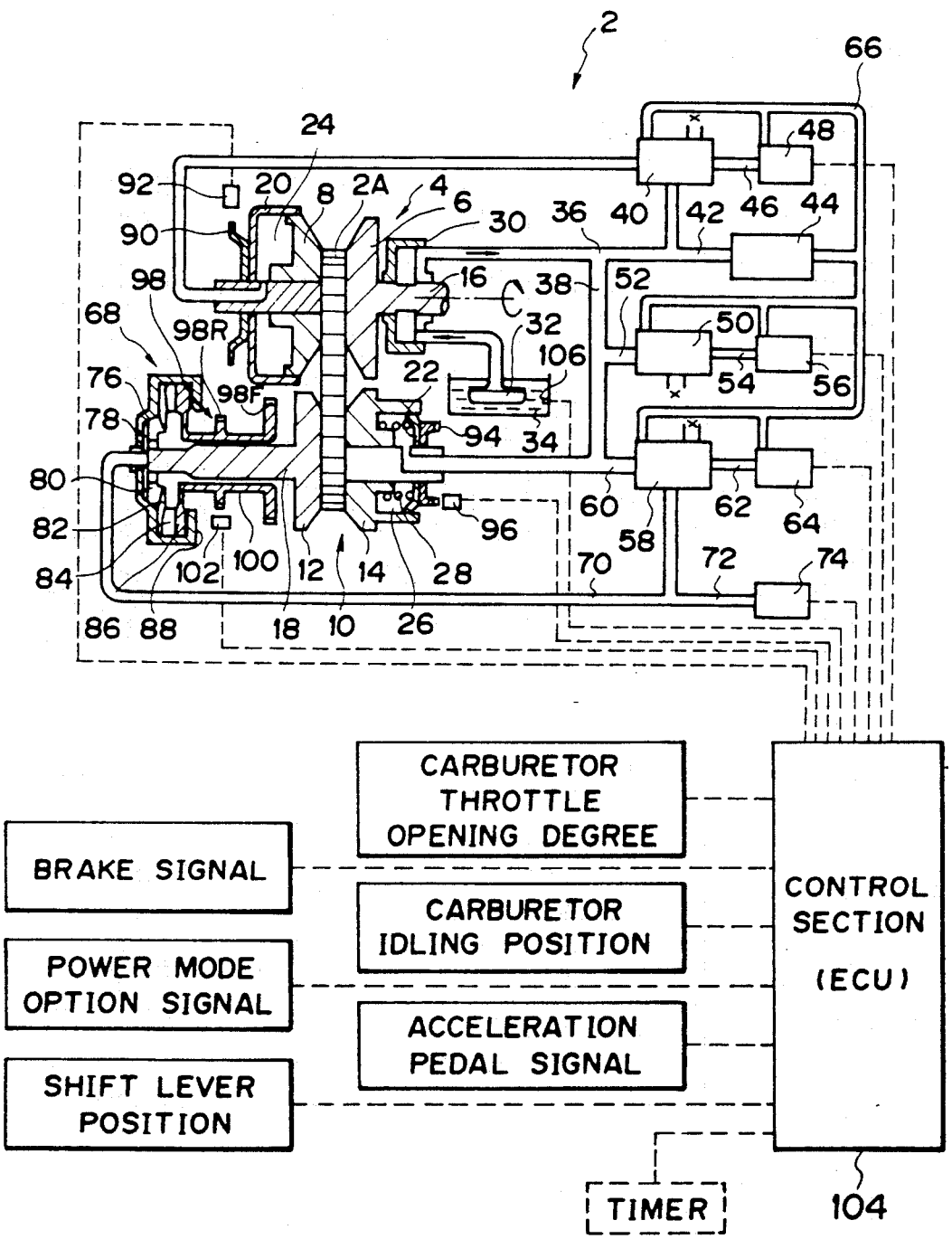
FIG. 5 is a schematic constructional diagram of a continuous variable transmission in which the control method of the invention is implemented.

FIGS. 1 to 5 show one embodiment of the invention. In FIG. 5, reference numeral 2 denotes a continuous variable transmission of, for example, the belt drive type; 2A a belt; 4 a driving side pulley; 6 a driving side fixed pulley member; 8 a driving side movable pulley member; 10 a driven side pulley; 12 a driven side fixed pulley member; and 14 a driven side movable pulley member.

The driving side pulley 4 has: the fixed pulley member 6 fixed to an input shaft 16 as a rotational shaft; and the movable pulley member 8 attached to the input shaft 16 so as to be axially movable and unrotatable relative to the input shaft 16. The driven side pulley 10 also has: the fixed pulley member 12 fixed to an output shaft 18 as a rotational shaft; and the movable pulley member 14 attached to the output shaft 18 so as to be axially movable and unrotatable relative to the output shaft 18 in a manner similar to the driving side pulley 4.

First and second housings 20 and 22 are attached to the movable pulley member 8 and the movable pulley member 14, respectively, and first and second hydraulic chambers 24 and 26 are respectively formed. Urging means 28 comprising a spring or the like is provided in the second hydraulic chamber 26. The urging means 28 presses the movable pulley member 14 in such a direction as to reduce a groove width between the fixed pulley member 12 and the movable pulley member 14.

An oil pump 30 is provided on the input shaft 16. An intake side of the oil pump 30 is communicated into an oil pan 34 through an oil filter 32. A discharge side of the oil pump 30 is communicated with the first and second hydraulic chambers 24 and 26 by first and second oil passages 36 and 38, respectively. A primary pressure control valve 40, as a speed change control valve to control a primary pressure as an input shaft sheave pressure, is arranged on the way of the first oil passage 36.

A constant pressure control valve 44 is communicated with the first oil passage 36 between the oil pump 30 and the primary pressure control valve 40. The constant pressure control valve 44 controls a line pressure (generally, 5 to 25 kg/cm$^2$) in passage 42 to a control oil pressure of a constant pressure (3 to 4 kg/cm$^2$) and extracts such a control oil pressure. A first 3-way electromagnetic valve 48 to control the primary pressure is communicated with the primary pressure control valve 40 by a fourth oil passage 46.

A line pressure control valve 50 having a relief valve function to control line pressure as a pump pressure is communicated with the second oil passage 38 by a fifth oil passage 52. A second 3-way electromagnetic valve 56 to control the line pressure is communicated with the line pressure control valve 50 by a sixth oil passage 54.

Further, a clutch pressure control valve 58 to control a clutch pressure as an oil pressure which acts on a hydraulic clutch 68, which will be explained hereinlater, is communicated through a seventh oil passage 60 with the second oil passage 38 between the second hydraulic chamber 26 and the passage 52. A third 3-way electromagnetic valve 64 to control the clutch pressure is communicated with the clutch pressure control valve 58 by an eighth oil passage 62.

The valves 40, 44, 48, 50, 56, 58, and 64 are respectively communicated by a ninth oil passage 66 which carries the control oil pressure of a constant pressure from the constant pressure control valve 44 to the primary pressure control valve 40, the first 3-way electromagnetic valve 48, the line pressure control valve 50, the second 3-way electromagnetic valve 56, the clutch pressure control valve 58, and the third 3-way electromagnetic valve 64.

The clutch pressure control valve 58 is communicated with a clutch hydraulic chamber 78, which will be explained hereinlater, of the automatic starting clutch 68 by a tenth oil passage 70. A pressure sensor 74 is connected to the tenth oil passage 70 by an eleventh oil passage 72. The pressure sensor 74 can directly detect oil pressure when the clutch pressure is controlled in a holding mode, a starting mode, or the like, and contributes when the system attempts to set the detected clutch pressure to a target clutch pressure. In a driving mode, the clutch pressure is equal to the line pressure, and therefore the pressure sensor can also contribute to line pressure control.

The automatic starting clutch 68 comprises: a casing 76 on the input side attached to the output shaft 18; the clutch hydraulic chamber 78 provided in the casing 76; a piston 80 which is pushed and advanced by oil pressure acting in the clutch hydraulic chamber 78; a ring-shaped string 82 to press the piston 80 in the backward (leftward) direction; a first pressure plate 84 which can be moved forward and backward by a pushing advancing force of the piston 80 and a pressing force of the ring-shaped spring 82; a friction plate 86 on the output side; and a second pressure plate 88 fixed to the casing 76.

In the automatic starting clutch 68, when a clutch pressure as an oil pressure which is allowed to act on the clutch hydraulic chamber 78 is raised, the piston 80 is pushed and advanced, thereby allowing the first pressure plate 84 and the second pressure plate 88 to be adhered to the friction plate 86. That is, a coupling state is obtained. On the contrary, when the clutch pressure as an oil pressure which is allowed to act on the clutch hydraulic chamber 78 is reduced, the piston 80 is moved backward by a pressing force of the ring-shaped spring 82, thereby allowing the first plate 84 and the second pressure plate 88 to be away from the friction plate 86. That is, a clutch disconnecting state is obtained. As mentioned above, the automatic starting clutch 68 is coupled (i.e. engaged) and removed (i.e. disengaged) by the clutch pressure, thereby connecting and disconnecting the friction plate 86 to and from the driving force which is generated by the continuous variable transmission 2.

An input shaft rotation detecting gear 90 is arranged on the outside of the first housing 20. A first rotation detector 92 on the input shaft side is arranged near the outer peripheral portion of the input shaft rotation detecting gear 90. An output shaft rotation detecting gear 94 is provided on the outside of the second housing 22. A second rotation detector 96 on the output shaft side is arranged near the outer peripheral portion of the output shaft rotation detecting gear 94. The engine rotational speed and the belt ratio are known by the rotational speeds which are detected by the first rotation detector 92 and the second rotation detector 96.

A gear 98 to transfer an output is provided for the automatic starting clutch 68. The output transferring gear 98 comprises a gear 98F to transfer a forward output and a gear 98R to transfer a backward (i.e. reverse) output. A third rotation detector 102 to detect a clutch output rotational speed as a rotational speed of a final output shaft 100 is arranged near the outer peripheral portion of the backward output transferring gear 98R. The third rotation detector 102 detects the clutch output rotational speed of the final output shaft 100, which shaft is fixed with friction plate 86 and is also connected to a forward/backward movement switching mechanism, an intermediate shaft, a final deceleration gear, a differential mechanism, a driving shaft, and wheels (all of them are not shown, but they are conventional). Thus, detector 102 can detect a vehicle velocity. On the other hand, a clutch input rotational speed and a clutch output rotational speed on both the input and output sides of the automatic starting clutch 68 can be also respectively detected by the rotational speeds which are detected by the second and third rotation detectors 96 and 102. The third rotation detector 102 thus also contributes to detect a clutch slip amount.

There is provided a control section 104 which receives, from various kinds of conventional sensors, a carburetor throttle opening degree signal, a carburetor idling position signal, an acceleration pedal signal, a brake signal, a power mode option signal, a shift lever position signal, and the like. Control section 104 also receives signals from the pressure sensor 74 and the first to third rotation detectors 92, 96, and 102, and executes controls. A signal from an oil temperature sensor 106 is also supplied to the control section 104. It will be apparent from the disclosed embodiment that the control section 104 may be implemented using a conventional microprocessor circuit.

In order to control the belt ratio and the clutch connecting/disconnecting state by the various kinds of input signals in accordance with various control modes, the control section 104 controls the opening and closing operations of the first 3-way electromagnetic valve 48 for primary pressure control, the second 3-way electromagnetic valve 56 for line pressure control, and the third 3-way electromagnetic valve 64 for clutch pressure control.

The functions of the input signals which are supplied to the control section 104 will now be described in detail.

(1) Detection signal of the shift lever position

Control of line pressure, belt ratio, and clutch pressure are required in each range defined by range signals of P, R, N, D, L, and the like.

(2) Detection signal of the carburetor throttle opening degree

Detection of engine torque and determination of a target belt ratio or a target engine rotational speed from data which has previously been stored in a memory of control section 104.

(3) Detection signal of the carburetor idling position

Correction of the carburetor throttle opening degree sensor and improvement of an accuracy in the control.

(4) Acceleration pedal signal

Detection of the will of the driver by a depressing state of the acceleration pedal and determination of a control method upon running or starting.

(5) Brake signal

Detection of the presence or absence of the depressing operation of the brake pedal and determination of a control direction for disconnection of the clutch or the like.

(6) Power mode option signal

Used as an option to set the performance of the vehicle into a sporty performance mode (or an economical performance mode).

(7) Oil temperature signal

Signal according to an oil temperature state of a hydraulic circuit. The oil temperature signal is generated from the oil temperature sensor 106 arranged in, for instance, the oil pan 34.

In the control clutch pressure of the automatic starting clutch 68 by the control section 104, there are four fundamental patterns. That is, (1) Neutral mode In the case of completely disconnecting the clutch when the shift position is set to N or P, the clutch pressure is set to the lowest pressure (zero).

(2) Holding mode

In the case where the throttle is removed when the shift position is set to D, L, or R and there is no will of running or in the case where the driver wants to decelerate during the running and to disconnect the engine torque, the clutch pressure is set to a low level such that the clutch is slightly engaged.

(3) Starting mode (special starting mode)

In the case of again coupling the clutch (special start) upon starting of the vehicle (normal start) or after the clutch was disconnected, the clutch pressure is set to a proper level in accordance with an engine generation torque (clutch input torque) at which an overdriving of the engine can be prevented and the vehicle can be smoothly operated.

(4) Driving mode

In the case where the vehicle has been shifted into the perfect running state and the clutch has been completely coupled, the clutch pressure is set to a high enough level at which the clutch can sufficiently withstand the engine torque.

The control section 104 controls the vehicle into the starting mode so as to set the automatic starting clutch 68 into the semi-coupling state upon starting of the vehicle. When a stalling time (i.e., the time during which the clutch remains in the semi-coupled, or slipping state) which is measured by a stall limiting timer is equal to or larger than a trigger value for the stall limiting timer, the control section 104 controls the vehicle into the driving mode so as to set the automatic starting clutch 68 into the complete coupling state.

In the above control method of the automatic starting clutch 68, in the case where the stalling time (i.e. slipping time) which is measured by the stall limiting timer is equal to or larger than a trigger value for the starting mode elapsed time of the starting mode and the clutch output rotational speed of the automatic starting clutch 68 is equal to or larger than a trigger value for the clutch output rotational speed, the control section 104 controls the vehicle into the driving mode so as to set the automatic starting clutch 68 into the complete coupling state even before the stalling time which is measured by the stall limiting timer reaches the trigger value for the stall limiting timer.

The operation will now be described.

As shown in FIG. 5, the oil pump 30 sucks the oil up from the oil pan 34 through the oil filter 32.

A pump pressure, namely, a line pressure as an oil pressure of the oil which is discharged from the oil pump 30 is controlled by the line pressure control valve 50. The line pressure is low when a leakage amount from the line pressure control valve 50, that is, a relief amount of the line pressure control valve 50, is large. On the contrary, the line pressure is high when the relief amount is small.

The operation of the line pressure control valve 50 is controlled by the 3-way electromagnetic valve 56. The line pressure control valve 50 operates in response to the operation of the 3-way electromagnetic valve 56. The 3-way electromagnetic valve 56 is controlled by the control section 104 at a desired duty ratio. That is, a duty ratio of 0% denotes a state in which the 3-way electromagnetic valve 56 doesn't operate at all and the output oil pressure is equal to zero. A duty ratio of 100% denotes a state in which the 3-way electromagnetic valve 56 operates and the maximum output oil pressure which is equal to the control pressure is obtained. As mentioned above, the 3-way electromagnetic valve 56 varies the output oil pressure by the duty ratio.

Therefore, the characteristics of the 3-way electromagnetic valve 56 are almost linear. The line pressure control valve 50 can be operated in an analog manner. The line pressure can be controlled by arbitrarily changing the duty ratio of the 3-way electromagnetic valve 56.

A primary pressure for a speed change control is controlled by the primary pressure control valve 40. The primary pressure control valve 40 is controlled by the 3-way electromagnetic valve 48 in a manner similar to the aforementioned control of line pressure control valve 50 by valve 56. The 3-way electromagnetic valve 48 is controlled by the control section 104 on the basis of the duty ratio in a manner similar to the 3-way electromagnetic valve 56. By varying the output oil pressure to the primary pressure control valve 40, the primary pressure is controlled.

When the primary pressure communicates with the line pressure, the belt ratio is shifted to the full overdriving side. When the primary pressure communicates with the atmosphere side, the belt ratio shifts to the full low side.

The clutch pressure control valve 58 controls the clutch pressure. When the maximum clutch pressure is needed, the clutch pressure control valve 58 is communicated with the line pressure side. When the lowest clutch pressure is necessary, the clutch pressure control valve 58 is communicated with the atmosphere side. The operation of the clutch pressure control valve 58 is controlled by the 3-way electromagnetic valve 64 in a manner similar to the aforementioned control of line pressure control valve 50 and primary pressure control valve 40.

The clutch pressure changes within a range from the lowest atmospheric pressure (zero) to the maximum line pressure. The clutch pressure is controlled by the following four fundamental patterns. That is, as mentioned above, (1) Neutral mode
(2) Holding
(3) Starting mode
(4) Driving The control of the fundamental pattern (1) is executed by a special change-over valve (not shown) which is interlocked with the shift operation. The controls of the other fundamental patterns (2), (3), and (4) are executed by the duty ratio controls of the first to third 3-way electromagnetic valves 48, 56, and 64 by the control section 104.

Particularly, in the state of (4), the seventh oil passage 60 and the tenth oil passage 70 are communicated by the clutch pressure control valve 58, thereby setting the maximum pressure generating state wherein the clutch pressure coincides with the line pressure.

The primary pressure control valve 40, the line pressure control valve 50, and clutch pressure control valve 58 are controlled by the output oil pressures from the first to third electromagnetic valves 48, 56, and 64, respectively. The control oil pressure to control the first to third 3-way electromagnetic valves 48, 56, and 64 is a constant oil pressure which is formed by the constant pressure control valve 44 and provided in passage 66. Although the control oil pressure is lower than the line pressure, it is a stable constant pressure. The control oil pressure also stabilizes the primary oil pressure control valve 40, the line pressure control valve 50, and the clutch pressure control valve 58.

The control of the continuous variable transmission 2 will now be described.

The continuous variable transmission 2 is hydraulically controlled and a proper line pressure from the control section 104, a primary pressure to change a gear/belt ratio, and a clutch pressure to certainly couple the automatic starting clutch 68 are assured in the continuous variable transmission 2, respectively.

FIG. 4 is a block diagram for control of the automatic starting clutch. The determination of a clutch pressure control signal duty ratio will now be described.

The control section 104 decides a feed-forward amount in accordance with a throttle opening degree θ (100), which feed-forward amount represents a temporary target clutch pressure. A filtering process of a primary delay is performed by a primary delay filter (102). The control section 104 decides a target engine rotational speed in accordance with the throttle opening degree θ (104). A filtering process of a primary delay is executed by a primary delay filter 106. An addition/subtraction (108) between an output of the primary delay filter 106 and an actual engine rotational speed NE is executed, thereby obtaining a difference between them. In a PI control (110), the difference between the target engine rotational speed and the actual engine rotational speed NE is subjected to proportional and integrating arithmetic operations to produce a target pressure correction value.

An addition/subtraction (112) between an output of the primary delay filter (102) and the output of the PI control (110) is executed, thereby obtaining a difference between the temporary target clutch pressure and the target pressure correction value. This difference is used as a target clutch pressure. Further, an addition (114) of a clutch engage pressure (i.e., the minimum clutch pressure required to effect any engagement of the clutch) to the target clutch pressure is performed, thereby obtaining a new target clutch pressure. The above value is supplied to a PID control (118) when a normal start control flag NST is selected in a control mode register SYFLR (116). On the other hand, when a drive control flag DRV is selected in the control mode register (116), an addition between a clutch pressure target value CPSP (see FIG. 2) and a clutch pressure ramp gain PCCDL (see FIG. 2) is executed and the resultant sum value is supplied to the PID control (118).

In the PID control (118), proportional, differential, and integrating arithmetic operations are executed. The PID control at 118 executes feedback control by calculating the difference between the target clutch pressure input thereto, and a feedback clutch pressure PCLU. An output of the PID control (118) is supplied as a clutch duty OPWCLU having a duty ratio for operating the 3-way electromagnetic valve 64 to control the operation of the clutch pressure control valve 58, unless a clutch solenoid duty output control flag CDI is selected in a control mode register CCFLR (122). If the CDI flag is selected, a duty ratio of 0% is generated as a clutch duty OPWCLU so that the output oil pressure of the 3-way electromagnetic valve 64 is equal to zero.

The clutch pressure is changed by the clutch duty OPWCLU, thereby engaging or disengaging the automatic starting clutch 68. That is, the automatic starting clutch 68 is completely engaged at a duty ratio of 0% and is completely disconnected at a duty ratio of 100% and is semi-coupled at an intermediate duty ratio between 0% and 100%.

The temporary target clutch pressure calculated at 100 represents a clutch pressure at which the engine torque corresponding to the target engine rotational speed (which is determined at 104 from the throttle opening degree θ) can be transferred.

Figure 1:
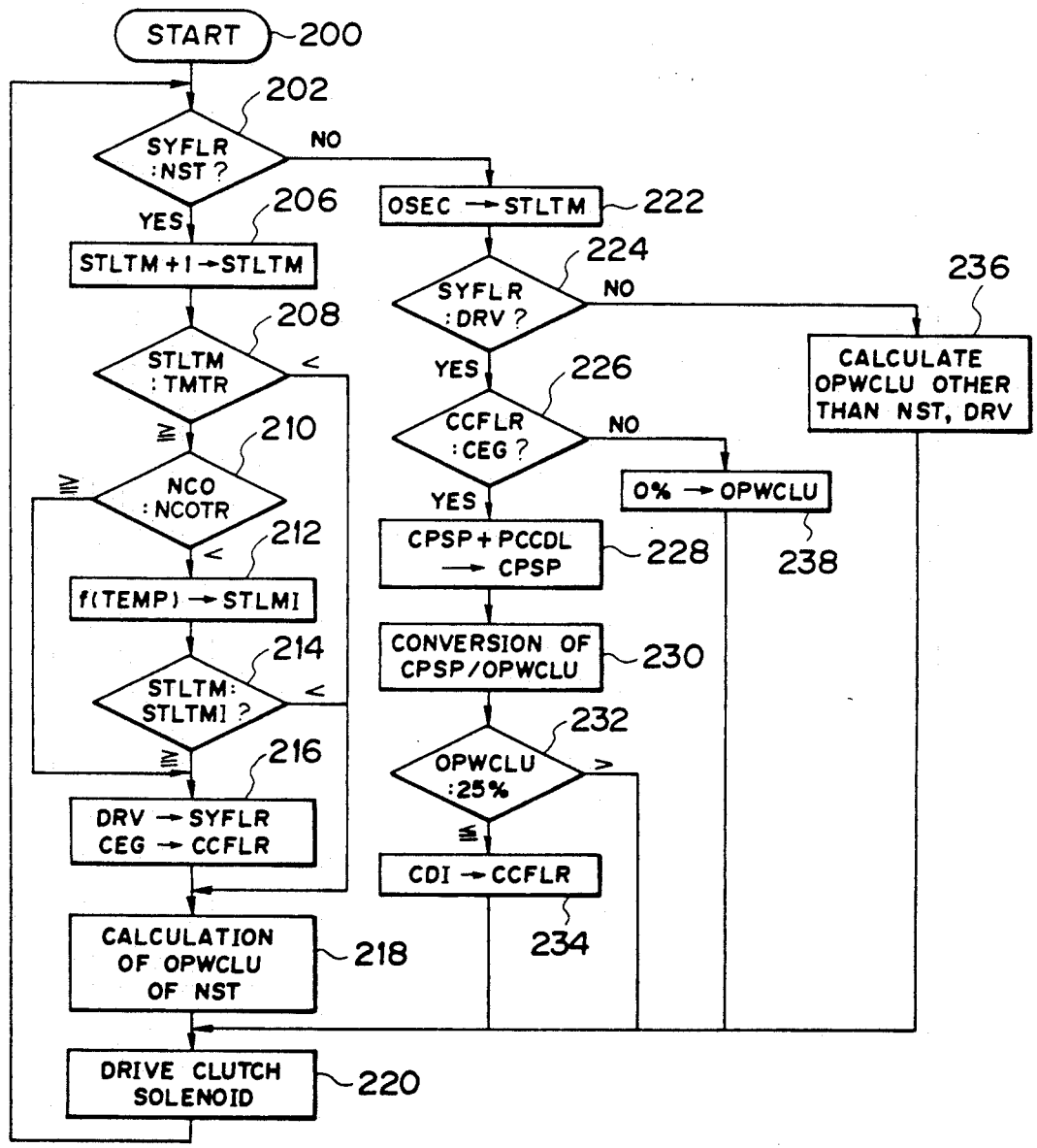
FIG. 1 is a flowchart of a control method of the invention.

The control of the automatic starting clutch 68 will be explained in accordance with FIG. 1.

When a program for a control of the continuous variable transmission 2 is started (200) by the driving of the internal combustion engine, a check is made at 202 to see if the normal start control flag NST has been selected in the control mode register SYFLR.

If the result of the discrimination 202 is YES, a stalling time is measured (206) by adding "1" to a stall limiting timer STLTM. The stalling time which is measured by the stall limiting timer STLTM is compared at 208 with a trigger value TMTR for the starting mode elapsed time of the starting mode.

In the discrimination 208, if the stalling time which is measured by the stall limiting timer STLTM is less than the trigger value TMTR for the starting mode elapsed time (STLTM<TMTR), the processing routine jumps to the calculation (218) of the clutch duty OPWCLU of the starting mode by the normal start control flag NST. A clutch solenoid (i.e. valve 64) is driven at 220 to control the clutch pressure of the automatic starting clutch 68. The processing routine is then returned to the discrimination 202 to see if the normal start control flag NST has been selected or not by the control mode register SYFLR.

In the discrimination 208, if the stalling time which is measured by the stall limiting timer STLTM is equal to or larger than the trigger value TMTR for the starting mode elapsed time (STLTM≧TMTR), a clutch output rotational speed NCO of the automatic starting clutch 68 is compared at 210 with a trigger value NCOTR for the clutch output rotational speed. The discrimination 210 is diagrammatically illustrated by the hatched portion of FIG. 3. In the discrimination 210, if the clutch output rotational speed NCO is less than the trigger value NCOTR for the clutch output rotational speed (NCO<NCOTR), a trigger value STLTMI for the stall limiting timer corresponding to an oil temperature TEMP which is detected by the oil temperature sensor 106 is calculated (212) from a correlation map f(TEMP) of the oil temperature TEMP. FIG. 3 shows STLTMI as a function of temperature. The stalling time which is measured by the stall limiting timer STLTM is compared at 214 with the trigger value STLTMI for the stall limiting timer.

In the discrimination 214, if the stalling time of the stall limiting timer STLTM is less than the trigger value STLTMI for the stall limiting timer, the processing routine jumps to the calculation (218) of the clutch duty OPWCLU of the normal start by the normal start control flag NST. The clutch solenoid is driven (220) and the processing routine is returned to the discrimination 202.

On the other hand, in the discrimination 214, if the stalling time of the stall limiting timer STLTM is equal to or larger than the trigger value STLTMI for the stall limiting timer, at 216 the drive control flag DRV is selected in the control mode register SYFLR and a clutch pressure target value closed control flag CEG is selected in the clutch pressure control mode register CCFLR. The clutch duty OPWCLU of the normal start by the normal start control flag NST is calculated (218). The clutch solenoid is driven (220) and the processing routine is returned to the discrimination 202.

In the discrimination 210, if the clutch output rotational speed NCO is equal to or larger than the trigger value NCOTR for the clutch output rotational speed, the calculation 212 of the trigger value STLTMI for the stall limiting timer by the correlation map f(TEMP) of the oil temperature TEMP and the comparison 214 between the stalling time which is measured by the stall limiting timer STLTM and the trigger value STLTMI for the stall limiting timer are bypassed. The processing routine proceeds to the selection at 216 of the drive control flag DRV in the control mode register SYFLR the clutch pressure target value closed control flag CEG in the clutch pressure control mode register CCFLR. The clutch duty OPWCLU of the normal start by the normal start control flag NST is calculated (218). The clutch solenoid is driven (220) and the processing routine is returned to the discrimination 202.

If NO in the discrimination 202 regarding whether the normal start control flag NST has been selected in the control mode register SYFLR, the stall limiting timer STLTM is set to 0 seconds (222). A check is made at 224 to see if the drive control flag DRV has been selected in the control mode register SYFLR.

If YES in the discrimination 224, a check is made at 226 to see if the clutch pressure target value closed control flag CEG has been selected in the clutch pressure control mode register CCFLR.

If YES in the discrimination 226, the clutch pressure ramp gain PCCDL is added to the clutch pressure target value CPSP at 228 (see FIG. 1), thereby calculating a new clutch pressure target value CPSP. The clutch pressure target value CPSP is converted into the clutch duty OPWCLU (230). A check is made at 232 to see if the clutch duty OPWCLU is equal to or less than 25% or is larger than 25%.

In the discrimination 232, if the clutch duty OPWCLU is equal to or less than 25%, the clutch solenoid duty output control flag CDI is selected in the clutch pressure control mode register CCFLR (234). The clutch solenoid is driven (220) and the processing routine is returned to the discrimination 202.

If NO in the discrimination 224, a clutch duty OPWCLU other than that obtained with the normal start control flag NST and the drive control flag DRV is calculated (236). The clutch solenoid is driven (220) and the processing routine is returned to the discrimination 202.

If NO in the discrimination 226, the clutch duty OPWCLU is set to 0% (238). The clutch solenoid is driven (220) and the processing routine is returned to the discrimination 202. The discrimination 226 is answered NO if, for example, the CDI flag was previously selected in register CCFLR at 234.

Further, if the clutch duty OPWCLU exceeds 25% in the discrimination 232, the clutch solenoid is driven (220) and the processing routine is returned to the discrimination 202.

Figure 2:
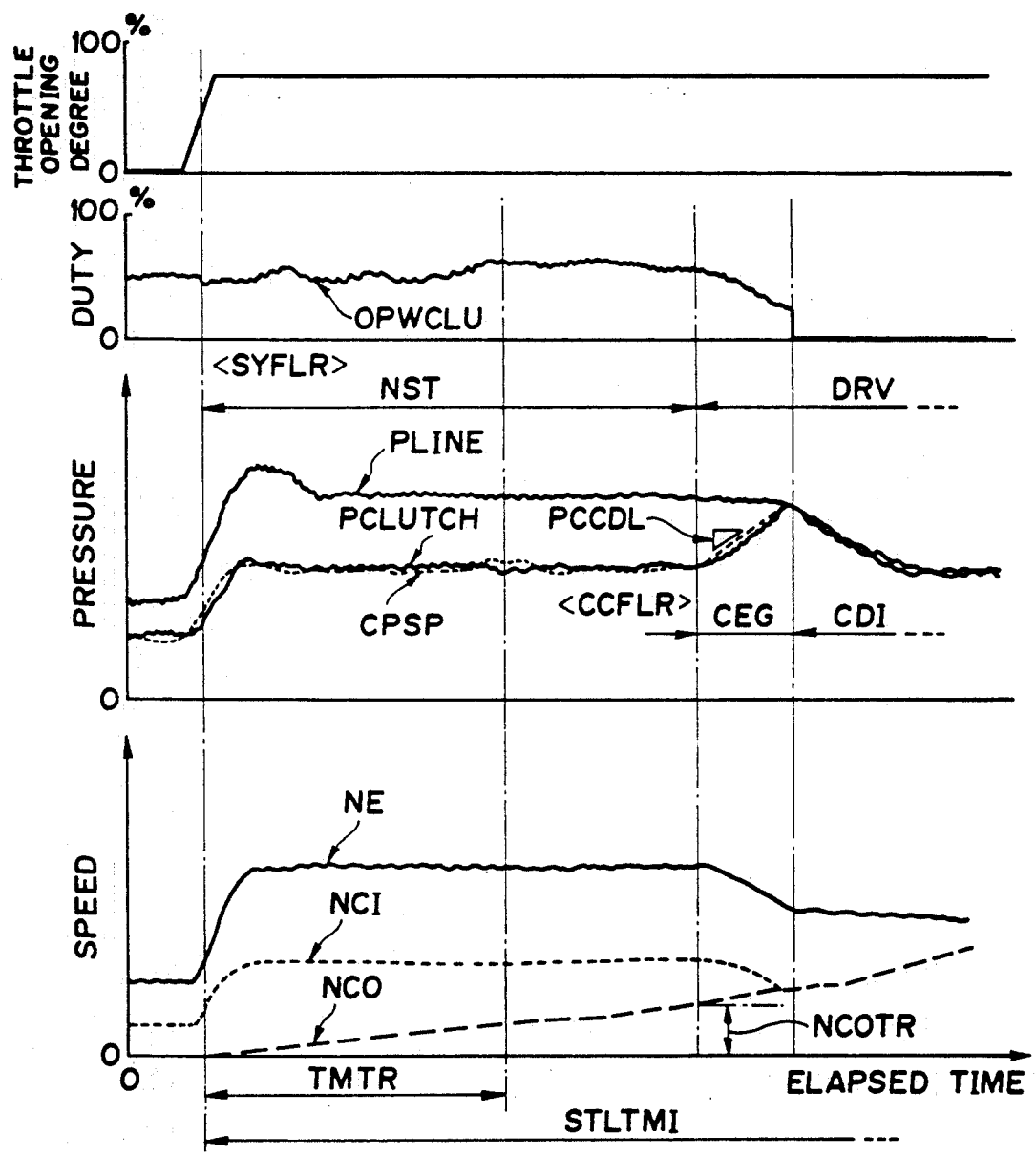
FIG. 2 is a time chart which illustrates the control according to FIG. 1.

As shown in FIGS. 2 and 3, and as mentioned above, in the case where the stalling time which is measured by the stall limiting timer STLTM is equal to or larger than the trigger value TMTR for the starting mode elapsed time and the clutch output rotational speed NCO is equal to or larger than the trigger value NCOTR for the clutch output rotational speed, the vehicle is controlled into the driving mode so as to set the automatic starting clutch 68 into the complete coupling state even before the stalling time which is measured by the stall limiting timer STLTM reaches the trigger value STLTMI for the stall limiting timer. In FIG. 2, NCI denotes a clutch input rotational speed.

That is, when a vehicle having the continuous variable transmission 2 is ordinarily started on a flat road, a time which is required to the control of the starting mode is equal to, e.g., two seconds or less. Therefore, when the control of the starting mode has continued for two seconds or longer, the following three vehicle states are considered.

1. Stalling state of the automatic starting clutch (first state).

2. Starting state under a condition in which a running resistance is large such as in the case of a climbing slope road (second state)

3. State in which the output of the internal combustion engine decreases or the transmission is abnormal (particularly, deterioration of the clutch) (third state).

In the second and third states above, it is desirable to set the automatic starting clutch 68 into the complete coupling state so as to effectively utilize the function of the vehicle.

Even in the second and third states, a large shock and an engine stall occur so long as the vehicle is not in a state such that it can endure setting the automatic starting clutch 68 into the complete coupling state.

Therefore, by setting the automatic starting clutch 68 into the complete coupling state in the case where the vehicle is not in the first state and in the case of a state in which even if the automatic starting clutch 68 has been set into the complete coupling state, a conspicuous inconvenience such as occurrence of a large shock, engine stall, or the like doesn't occur, an increase in oil temperature and a burning due to the continuation of the stalling state are prevented.

In the above case, if the clutch is suddenly set into the complete coupling state, the above inconvenience occurs. Therefore, the occurrence of such an inconvenience is avoided by gradually reducing the clutch duty of the clutch solenoid.

The above control will be described in more detail.

To judge the above first to third states, a check is made to see if control in the starting mode has continued for a period of time which is equal to or longer than a time which is required for ordinary starting on a flat road, by comparing the stall limiting timer (STLTM) and the trigger value TMTR, which trigger value is slightly smaller than the time which is required for the ordinary starting on a flat road.

If STLTM≧TMTR, the vehicle is in one of the first to third states. A check is now made to see if the vehicle is in the second and third states instead of the first state. If the vehicle is in the stalling state, the vehicle velocity (clutch output rotational speed NCO) is equal to 0 km/h. Therefore, if NCO≠0 km/h, the vehicle is in the second or third state.

Subsequently, a check is made to see if no inconvenience occurs even if the automatic starting clutch 68 is forcedly set into the complete coupling state. To make the above discrimination, a method by a clutch slip and a method by the clutch output rotational speed NCO are considered. In the disclosed embodiment, the discrimination is made by using the clutch output rotational speed NCO. If the clutch output rotational speed NCO is equal to or larger than a predetermined trigger value (NCOTR) for the clutch output rotational speed, the automatic starting clutch 68 can be set into the complete coupling state instead of the stalling state. In such a state, therefore, the control to set the automatic starting clutch 68 into the complete coupling state is executed.

On the other hand, if the stalling state continues and the above conditions are not satisfied (i.e., NCO<NCOTR), the apparatus waits until the stalling time which is measured by the stall limiting timer is equal to or larger than the trigger value for the stall limiting timer (STLTM≧STLTMI) in a manner similar to the conventional method. Then, the automatic starting clutch 68 is set into the complete coupling state.

As a principle, there is a relation of TMTR≦STLTMI between the trigger value TMTR for the starting mode elapsed time and the trigger value STLTMI for the stall limiting timer (see FIG. 3).

The stall limiting timer may be provided in the control section 104, or may also be implemented as a separate timer connected to the control section (see broken lines in FIG. 5).

By controlling as mentioned above, clutch control in the starting mode is not vainly continued. The automatic starting clutch 68 can be rapidly set into the complete coupling state in consideration of the state of the vehicle upon starting of the vehicle.

Thus, the time of the semi-coupling state of the automatic starting clutch 68 can be reduced and the increase in oil temperature and the burning can be suppressed as a result of such a reduced time, so that the increase in oil temperature of the automatic starting clutch 68 and the burning thereof can be more effectively prevented. The loss of driving force of the internal combustion engine due to the semi-coupling state of the automatic starting clutch 68 can be reduced. The energy can be efficiently used. The driving energy which is generated by the internal combustion engine can be more efficiently transferred to the driving wheels. The motive power performance can be improved.

Since the automatic starting clutch 68 can be promptly set into the complete coupling state in consideration of the state of the vehicle, it is possible to avoid a fear of occurrence of a shock or an engine stall in the complete coupling state of the automatic starting clutch 68. It is also possible to cope with a bad condition or an abnormality of the internal combustion engine or the transmission. It is practically advantageous.

Further, the invention can be implemented by changing the program in the control section with little increase in costs, and is therefore economically advantageous.

According to the invention, as mentioned above, clutch control in the starting mode is not vainly continued and the automatic starting clutch can be promptly set into the complete coupling state in consideration of the state of the vehicle upon starting of the vehicle.

The oil temperature sensor 106 detects the temperature of oil in the oil pan 34. When oil temperature increases are indicated by a detection signal from the oil temperature sensor 106, the trigger value STLTMI is reduced. When the starting control time STLTM is equal to or larger than trigger value STLTMI, the starting control is stopped by the control unit 104, thereby controlling so as to couple the automatic starting clutch.

Explaining in detail, the trigger value STLTMI of the stall limiting timer is a function of the detection signal received from the oil temperature sensor 106 (i.e. a function of oil temperature) as shown in FIG. 6. When the oil temperature is low, the trigger value STLTMI of the stall limiting timer is set to a long value and the control to forcedly couple the clutch is continued until a clutch input rotational speed (NCI) and a clutch output rotational speed (NCO) approach one another (i.e. NCO≅NCI).

When the oil temperature is high, as shown in FIG. 6, the trigger value STLTMI of the stall limiting timer is set to a short value, thereby controlling so as to reduce an increase in oil temperature in association with the starting control.

Figure 7:
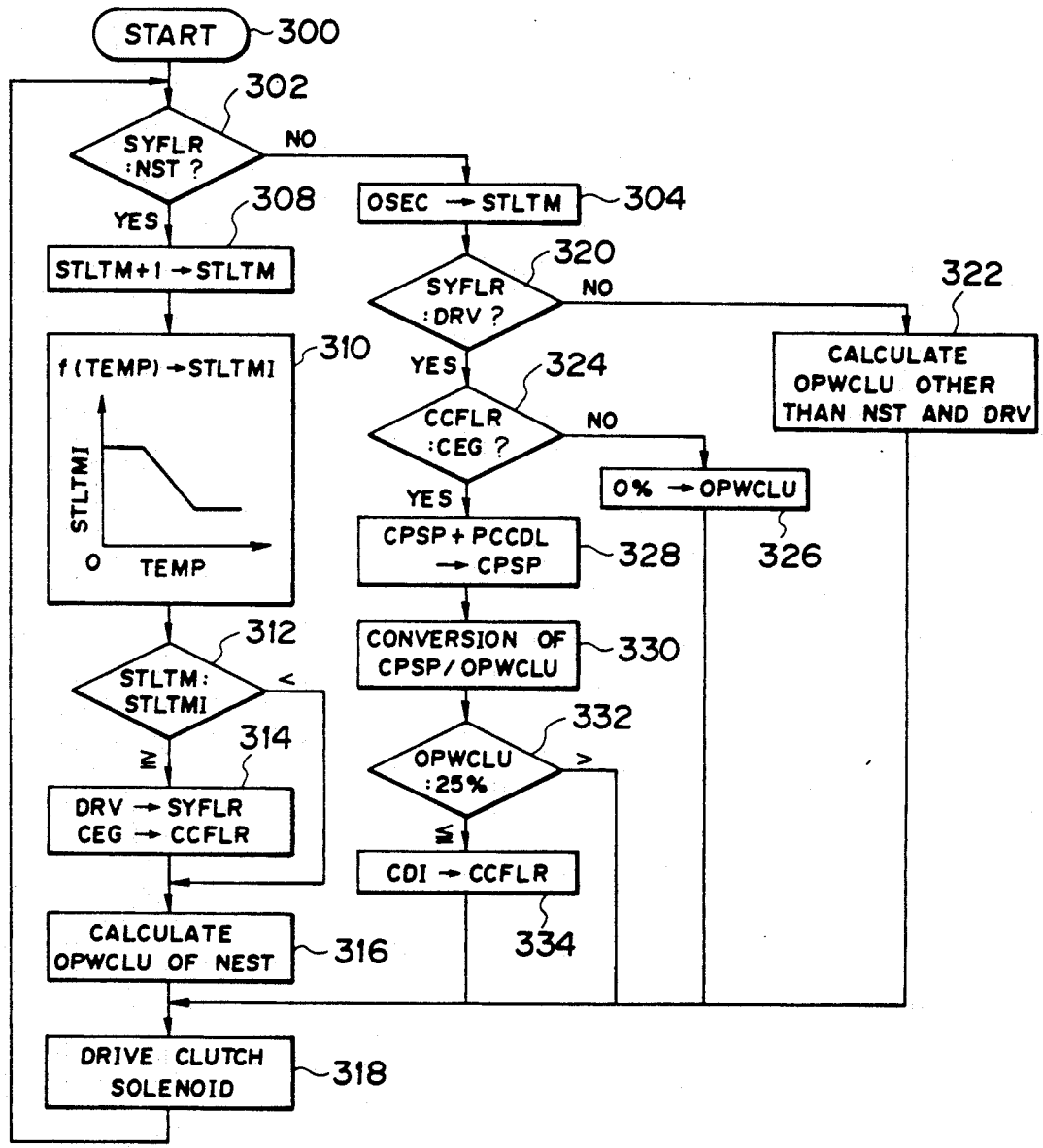
FIG. 7 is a flowchart of a control method of the invention.

Referencing FIG. 7, a program to control the clutch 68 is started by the driving of an internal combustion engine (300). A check is made in the control mode register SYFLR at 302 to see if the normal start control flag NST has been set to the high level or not. If NO in the discrimination 302, 0 seconds is set into the stall limiting timer STLTM (304).

On the other hand, if YES in the discrimination 302, "1" is added to the stall limiting timer STLTM, thereby setting a new stall limiting timer STLTM (308).

The detection signal from the oil temperature sensor 106 is supplied to the control unit 104 and the trigger value STLTMI of the stall limiting timer corresponding to the oil temperature is obtained from a correlation map (310). The value of the stall limiting timer STLTM and the trigger value STLTMI of the stall limiting timer are compared (312).

In the discrimination 312, if the value of the stall limiting timer STLTM is equal to or larger than the trigger value STLTMI of the stall limiting timer, at 314, the control mode register SYFLR selects the drive control flag DRV and a clutch pressure target value closed control flag CEG is selected in a clutch pressure control mode register CCFLR. The clutch duty OPWCLU of the normal start control flag NST is calculated (316).

In the discrimination 312, if the value of stall limiting timer STLTM is less than the trigger value STLTMI of the stall limiting timer, the selection (314) of the DRV flag and the clutch pressure target value closed control flag CEG is bypassed and the clutch duty OPWCLU of the normal start control flag NST is calculated (316). The clutch solenoid is driven (318)

After completion of the process 304 to set 0 seconds into the stall limiting timer STLTM, a check is made at 320 to see if the drive control flag DRV has been set to the high level or not. If NO in the discrimination 320, a clutch duty OPWCLU other than that associated with the normal start control flag NST and the drive control flag DRV is calculated (322). The clutch solenoid is driven (318).

If YES in the discrimination 320, a check is made at 324 to see if the clutch pressure target value closed control flag CEG has been set to the high level or not. If NO in the discrimination 324 (for example, if CDI was previously set in CCFLR at 334), the clutch duty OPWCLU is set to 0% (326). The clutch solenoid is driven (318). If YES in the discrimination 324, the clutch pressure ramp gain PCCDL is added to the clutch pressure target value CPSP at 328, thereby obtaining a new clutch pressure target value CPSP (see FIG. 2).

A conversion between the clutch pressure target value CPSP and the clutch duty OPWCLU is executed (330). A check is now made at 332 to see if the clutch duty OPWCLU is equal to or less than 25%. If the clutch duty OPWCLU exceeds 25% in the discrimination 332, the clutch solenoid is driven (318). If the clutch duty OPWCLU is equal to or less than 25% in the discrimination 332, the clutch solenoid duty output control flag CDI is selected in the clutch pressure control mode register CCFLR at 334 and, thereafter, the clutch solenoid is driven (318).

After the clutch solenoid is driven (318), a check is again made to see if the normal start control flag NST has been set to the high level in the above control mode register SYFLR or not (302).

Hitherto, even when the oil temperature is high, the starting control has been executed until position A shown in FIG. 8(a). On the other hand, as shown in FIG. 8(b), when the present invention detects high oil temperature, the starting control is performed only until position C, and the increase in oil temperature in association with the starting control is eliminated for the time between positions C and A.

On the contrary, when the invention detects that the oil temperature is low, the starting control is executed until position A as shown in FIG. 8(a). The engine rotational speed NE is merely slightly fluctuated after the position B. A clutch slip amount is reduced and a shock upon coupling of the clutch is decreased.

Thus, the trigger value STLTMI of the stall limiting timer can be changed from the correlation map (FIG. 6) in accordance with the oil temperature as detected by the oil temperature sensor 106. For instance, when the oil temperature is high, as shown in FIG. 8(b), a larger than necessary increase in oil temperature during the starting control can be prevented. Burning of the clutch can be reduced. The use life of the clutch can be prolonged. The costs can be reduced. It is economically advantageous.

When the oil temperature is low, as shown in FIG. 8(a), the starting control can be continued for a long time in a manner similar to the conventional case. A shock which occurs when the clutch is forcedly coupled can be reduced. It is practically advantageous.

Further, since it is possible to implement the invention by changing the program in the control unit 104, the structure is not complicated, the costs can be reduced, and it is economically advantageous.

In the disclosed invention, the trigger value STLTMI of the stall limiting timer has been obtained as a function of the oil temperature, that is, by the correlation map of FIG. 6. However, it is also possible to preset a calculating equation and to calculate the trigger value STLTMI of the stall limiting timer from the calculating equation using the detection signal from the oil temperature sensor.

As described in detail above, according to the invention, the oil temperature sensor to detect the oil temperature in the oil pan is provided and, when the oil temperature is high, the trigger value is set to a small value, and when the starting control time is equal to or larger than the trigger value on the basis of the measurement signal from the stall limiting timer, the starting control is stopped by the control unit, the automatic starting clutch is coupled, and the trigger value of the stall limiting timer can be changed in accordance with the oil temperature. For instance, when the oil temperature is high, a larger than necessary increase in oil temperature during the starting control can be prevented, the burning of the clutch can be reduced, the use life of the clutch can be prolonged, the costs can be reduced, and it is economically advantageous. On the contrary, when the oil temperature is low, the starting control can be continued for a long time in a manner similar to the conventional case. Thus, a shock which occurs when the clutch is forcedly coupled can be reduced and it is economically advantageous.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In an automatic starting clutch control method which, upon starting of a vehicle, includes the steps of operating the vehicle in a starting mode to set an automatic starting clutch into a semi-coupling state and thereafter, when a slipping time measured by a timer is equal to or larger than a first trigger value for the timer, shifting the vehicle to a driving mode to set the automatic starting clutch into a complete coupling state, the improvement comprising the step of shifting the vehicle to the driving mode to set the automatic starting clutch into the complete coupling state before the slipping time measured by the timer reaches the first trigger value when (1) the slipping time is equal to or larger than a second trigger value for a starting mode elapsed time which is less than said first trigger value and (2) a clutch output rotational speed of the automatic starting clutch is equal to or larger than a third trigger value for the clutch output rotational speed.

2. In an automatic starting clutch control method which includes the steps of operating in a starting mode while using a timer to measure a starting control time and, when a measurement signal from the timer indicates that the starting control time is equal to or larger than a trigger value, terminating the starting mode and thereafter operating in a driving mode in which an automatic starting clutch is coupled, the improvement comprising the steps of using an oil temperature sensor to detect a temperature of oil in an oil pan and reducing said trigger value when the oil temperature rises.

3. A method of controlling a friction type clutch of a vehicle having an engine and a drive train, said clutch being operated by hydraulic oil and being frictionally engageable to transfer rotational driving force from an output shaft of the engine to the drive train, said method comprising the steps of:
    causing said clutch to assume a slipping state of engagement upon starting of the vehicle;
    monitoring a temperature of said hydraulic oil;
    defining a first amount of time as a function of a temperature of said hydraulic oil; and
    determining that said first amount of time has elapsed since the starting of the vehicle, and thereafter positively urging said clutch from said slipping state of engagement into a locked up state of engagement.

4. The method according to claim 3, including the steps of:
    monitoring an output rotational speed of said clutch; and
    positively urging said clutch from said slipping state of engagement into said locked up state of engagement prior to expiration of said first amount of time if the clutch output rotational speed has reached a predetermined value when a second amount of time less than said first amount of time has elapsed since the starting of the vehicle.

5. A method according to claim 3, wherein said step of defining said first amount of time includes the steps of respectively increasing and decreasing said first amount of time as the temperature of said hydraulic oil respectively decreases and increases.

* * * * *